Dec. 2, 1930.    H. BROST    1,783,902
BRAKE ADJUSTER
Filed April 12, 1929    2 Sheets-Sheet 1

Henry Brost
INVENTOR
BY Victor J. Evans
ATTORNEY

Dec. 2, 1930.  H. BROST  1,783,902
BRAKE ADJUSTER
Filed April 12, 1929   2 Sheets-Sheet 2

Henry Brost
INVENTOR

BY Victor J. Evans
ATTORNEY

Patented Dec. 2, 1930

1,783,902

UNITED STATES PATENT OFFICE

HENRY BROST, OF MEDFORD, WISCONSIN

BRAKE ADJUSTER

Application filed April 12, 1929. Serial No. 354,681.

This invention relates to devices for use in adjusting the brakes of an automobile, an object being to provide a device by means of which one man may expeditiously and accurately adjust the brakes and thus save the services of the additional man usually required.

To this end the invention provides a power operated device which may be attached to the service brake pedal and operated to apply the brakes so that the mechanic adjusting the brakes may determine their action, means being provided whereby the mechanic referred to may control the operation of the device so that he may apply and release the brakes at will.

With the above and other objects in view, the invention further includes the following novel features and details of construction, to be hereinafter more fully described, illustrated in the accompanying drawings and pointed out in the appended claims.

In the drawings:—

Figure 1:
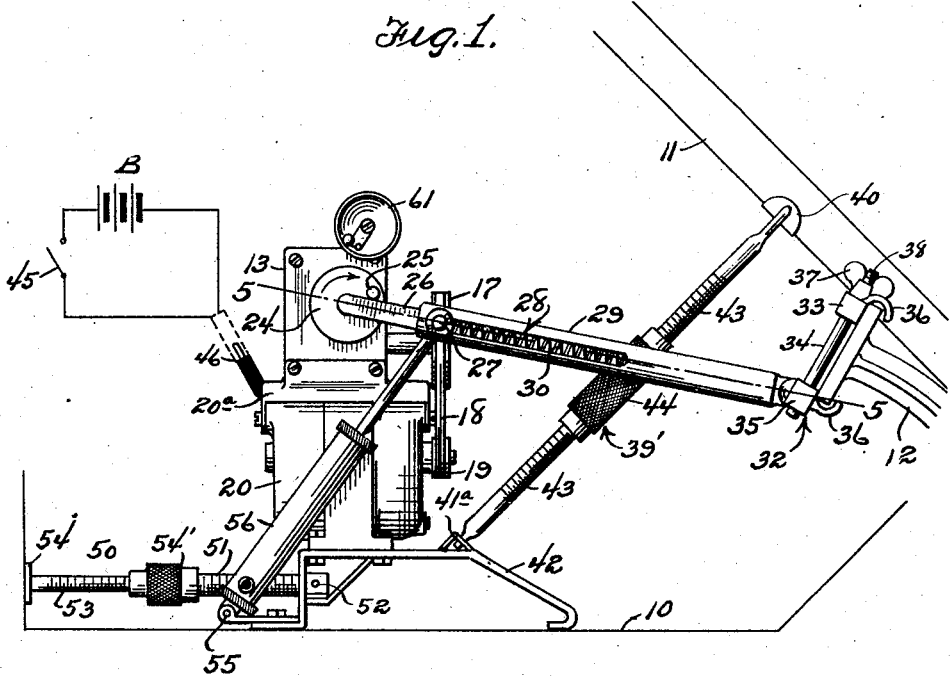
Figure 1 is an elevation illustrating the invention in position for use, a portion of an automobile being shown in outline.
Figure 2:
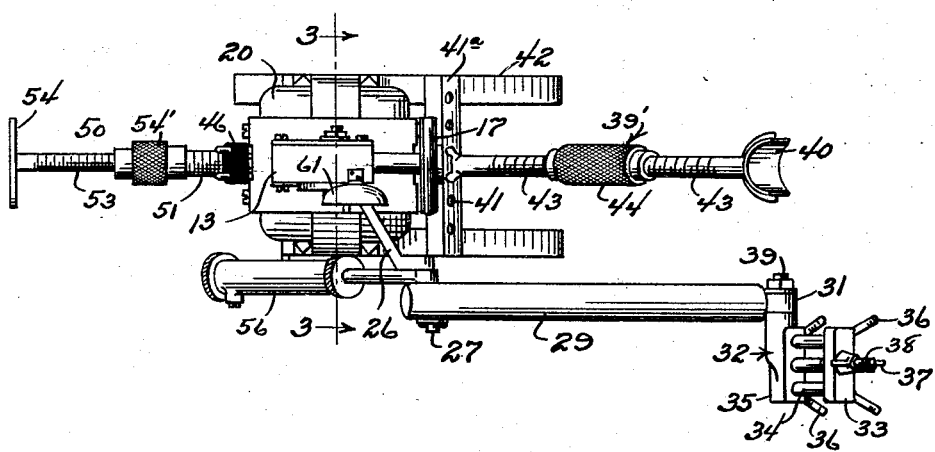
Figure 2 is a plan view of the invention per se.
Figure 3:
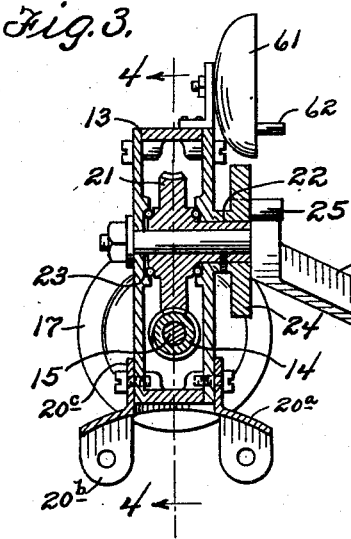
Figure 3 is a section on the line 3—3 of Figure 2.
Figure 4:
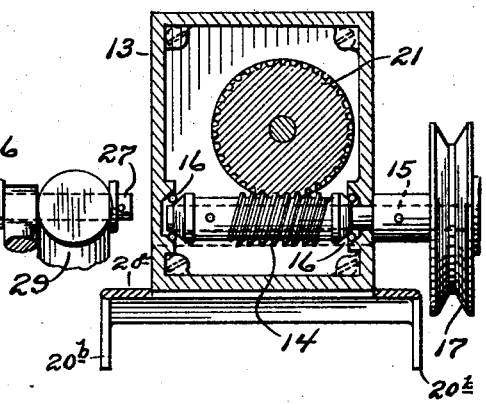
Figure 4 is a section on the line 4—4 of Figure 3.
Figure 5:
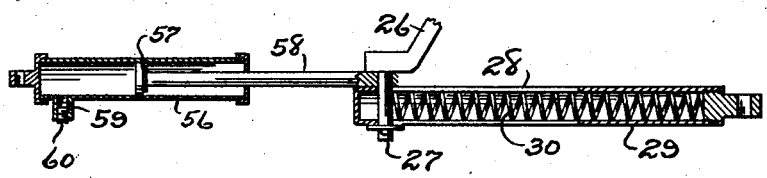
Figure 5 is a sectional view of the pitman taken on the line 5—5 of Figure 1.
Figure 6:
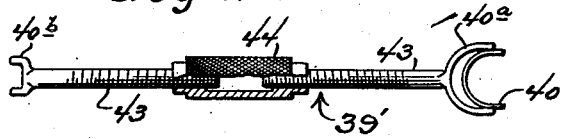
Figure 6 is an elevation partly in section showing the adjustable brace.

Referring to the drawings in detail wherein like characters of reference denote corresponding parts, the reference character 10 indicates the floor line of an automobile and 11 the steering post, while the service brake pedal is indicated at 12.

As is well known, when adjusting the service brakes of an automobile it is necessary that the mechanic or other person operate the brake pedal so that the mechanic making the adjustment can see the action of the brakes. The present invention eliminates the service of a mechanic for operating the brake pedal by providing mechanical means for operating the brake pedal which is controlled by the mechanic making the adjustment.

As shown in the drawings this means consists of a gear box 13 within which is housed a worm 14 mounted on a shaft 15, the latter operating in friction bearings 16. The shaft 15 has fast thereon a grooved pulley 17 which is driven by a belt 18 and pulley 19, the last mentioned pulley being mounted upon the shaft of a motor 20.

In order to mount the gear box 13 upon the motor, the invention provides a saddle 20a and this saddle is provided with spaced ears 20b removably attached to the motor, and with spaced parallel flanges 20c removably attached to the gear box 13.

The worm 14 drives a gear 21 which is positioned within the gear box and this gear is mounted upon a shaft 22 which operates in anti-friction bearings 23. The shaft 22 extends beyond the gear box and has fast thereon a collar 24 from which projects a pin 25. A crank arm 26 is mounted for free rotation upon the shaft 22 and the outwardly extending portion 27 of the crank arm 26 is pivotally and slidingly mounted in a slot 28 provided in a pitman 29. This pitman is of hollow construction and houses a coil spring 30 which gears against the outwardly extending portion 27 of the crank arm 26.

Figure 7:
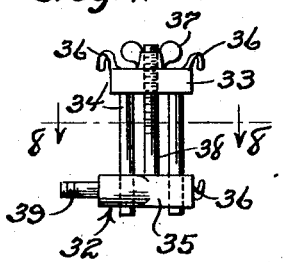
Figure 7 is an elevation of the pedal clamp.
Figure 8:
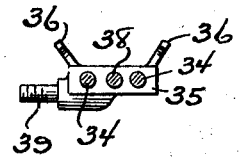
Figure 8 is a section on the line 8—8 of Figure 7.
Figure 9:
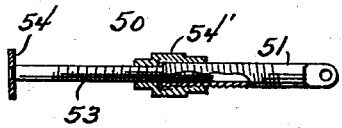
Figure 9 is a detail view partly in section showing one of the braces.

One end of the pitman is pivotally secured as shown at 31 to a clamp 32 which is adapted to be detachably secured to the foot pedal 12. This clamp is shown in detail in Figures 7 and 8 of the drawings and comprises a bar 33 from which extend spaced parallel rods 34. Slidingly mounted upon these rods 34 is a bar 35 which, together with the bar 33 acts as a clamp to engage the pedal 12. As shown in the drawings the bars 33 and 34 carry gripping fingers 36 to engage behind the pedals and the bars are held in clamping position by means of a thumb nut 37 which is mounted upon one end of a threaded rod 38. This rod is carried by the bar 35 and passes through the bar 33. The bar 35 also carries a stud 39 by means of which pivotal connection with the pitman 29 is effected.

In order to stabilize the device and hold the same in position for use there is provided a brace 39'. This brace carries at one end a saddle 40 which is preferably pivotally mounted in the bifurcated end 40a of this brace and which receives the steering post 11. The opposite end of the brace is provided with spaced fingers 40b which are adapted to be removably positioned in openings 41 provided in a cross bar 41a of a stand or base 42. The brace 39' may thus be adjusted laterally of the base or stand 42 so as to properly position the same with respect to the steering post 11, while the pivotal mounting of the saddle 40 enables the latter to properly grip the post.

The brace 39' includes oppositely threaded sections 43, the saddle 40 being carried by the outer end of one section, while the spaced fingers 40b are carried at the outer end of the other section. The threaded sections 43 are connected by an internally threaded sleeve 44 whose outer surface is knurled, so that the brace may be adjusted to properly grip the post 11.

Also extending from the stand or base 42 is a brace 50. This brace is of sectional construction and includes an inner section 51 which is pivotally secured to the base or stand 42 as shown at 52. The section 51 is hollow and receives a threaded section 53 which is adjustable with respect to the section 51 and is held in adjusted position by means of a knurled coupling 54'. The outer end of the section 53 carries a disk 54 which is adapted to be positioned against the front portion of the front seat of an automobile as shown in Figure 1 of the drawings.

The motor 20 may receive current from any suitable source of power indicated at B in Figure 1 of the drawings and may be controlled by a switch 45. This switch may be within convenient reach of the mechanic adjusting the brakes so that he can control the operation of the device. A suitable plug and socket connection indicated at 46 in Figure 1 may be provided so that the motor may be readily connected in circuit with a source of power.

When it is desired to depress the pedal 12 and apply the brakes, the switch 45 is closed so that the motor will be operated. The operation of the motor will rotate the shafts 15 and 22, but as the crank arm 26 is free upon the shaft no movement of the crank arm will occur until the pin 25 which travels in the direction of the arrow shown in Figure 1 of the drawings, engages the crank arm. The pitman 29 will then be forced in the direction to depress the pedal 12, the spring 30 compensating for any difference in the degree of movement of the pedal.

As soon as the crank arm 26 passes over center, it will be disengaged from the pin 25 so that it will return under the action of the spring of the brake pedal and will be free of the shaft 22.

In order to cushion the return movement of the crank arm and prevent a sudden slamming action, the base or stand 42 has pivotally secured thereto as shown at 55, one end of a cylinder 56. Operating within this cylinder is a plunger 57 to which is connected one end of a rod 58. The opposite end of this rod is pivotally connected to the member 27, so that as the pitman 29 returns, return movement will be checked by the compression of air within the cylinder 56. The cylinder 56 is provided with an air escape port 59 which is controlled by a screw 60.

Mounted upon the gear box 13 is a bell 61 and extending from the clapper of this bell is a pin 62. This pin is located in the path of the crank arm 26 and is engaged by the crank arm just before the latter passes over center. The mechanic making the brake adjustment will then be notified of the position of the brake pedal.

The invention is susceptible of various changes in its form, proportions and minor details of construction and the right is herein reserved to make such changes as properly fall within the scope of the appended claims.

Having described the invention what is claimed is:—

1. In a device of the character described, a stand adapted to be placed in an automobile a crank arm mounted for rotation upon said stand, a pitman having one end operatively connected to the crank arm and its opposite end adapted for attachment to the foot pedal of the automobile, and means to operate the crank arm to force the pitman in one direction and to permit return movement of the pitman.

2. In a device of the character described, a stand adapted to be placed in an automobile, a crank arm mounted for rotation upon said stand, a pitman, a yieldable pivotal connection between the crank arm and one end of the pitman, means at the other end of the pitman for detachable connection with the brake pedal of an automobile, and means to operate the crank arm to force the pitman in one direction and to permit return movement of the pitman.

3. In a device of the character described, a stand adapted to be placed in an automobile, a crank arm mounted for free rotation upon said stand, a pitman having one end operatively connected to the crank arm and its opposite end adapted for connection with the foot pedal of an automobile, and means to operate the crank arm to force the pitman in one direction and to permit return movement of the pitman.

4. In a device of the character described, a stand adapted to be placed in an automobile, a crank arm mounted for rotation upon said stand, a pitman having one end operatively connected to the crank arm and its opposite end adapted for attachment to the foot pedal of the automobile, means to operate the crank arm to force the pitman in one direction and to permit of free return movement of the pitman, and means to control the operation of the device from a remote point.

5. In a device of the character described, a stand adapted to be placed in an automobile, a shaft mounted for rotation in said stand, means to operate the shaft, a crank arm free upon the shaft, a pitman having one end operatively connected with the crank arm and its opposite end adapted for connection with the pedal of an automobile, means to rotate the shaft, and means operable when the shaft is rotated to engage and move the crank arm in a direction to depress said pedal during a partial rotation of the shaft only.

6. In a device of the character described, a stand adapted to be placed in an automobile, a crank arm mounted for rotation upon said stand, a pitman having one end operatively connected to the crank arm and its opposite end adapted for attachment to the foot pedal of the automobile, means to operate the crank arm to force the pitman in one direction and to permit return movement of the pitman, and means to cushion the return movement of the pitman.

7. In a device of the character described, a stand adapted to be placed in an automobile, a crank arm mounted for rotation upon said stand, a pitman having one end operatively connected to the crank arm and its opposite end adapted for attachment to the foot pedal of the automobile, means to operate the crank arm to force the pitman in one direction and to permit return movement of the pitman, a cylinder pivotally mounted at one end, a plunger within the cylinder, and a rod connecting said plunger with the pitman to yieldingly resist return movement of the pitman.

8. In a device of the character described, a stand adapted to be placed in an automobile, a crank arm mounted for rotation upon said stand, a pitman having one end operatively connected to the crank arm and its opposite end adapted for attachment to the foot pedal of the automobile, means to operate the crank arm to force the pitman it one direction and to permit return movement of the pitman, a signal, and means to operate the signal when the crank arm reaches a predetermined position.

In testimony whereof I affix my signature.

HENRY BROST.